Nov. 13, 1945.  T. C. CHEASLEY  2,388,829
DRAFT CONTROL FOR HEATERS
Filed Sept. 19, 1941  2 Sheets-Sheet 1
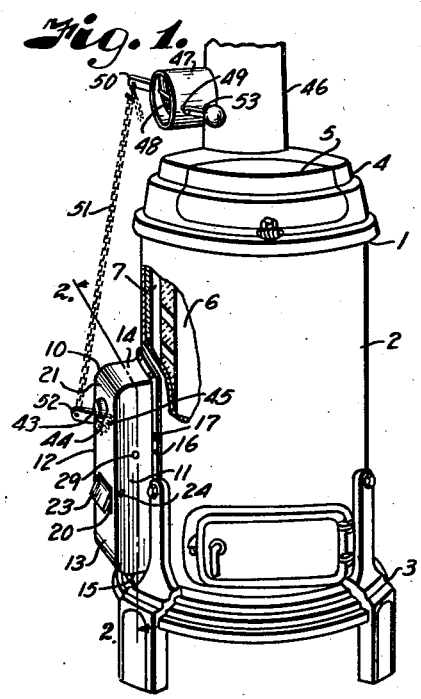
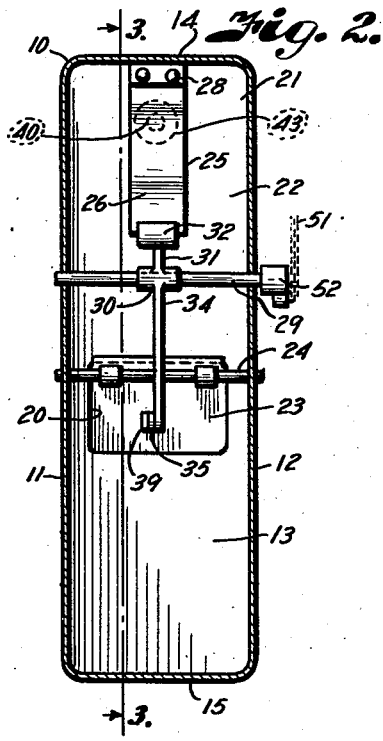
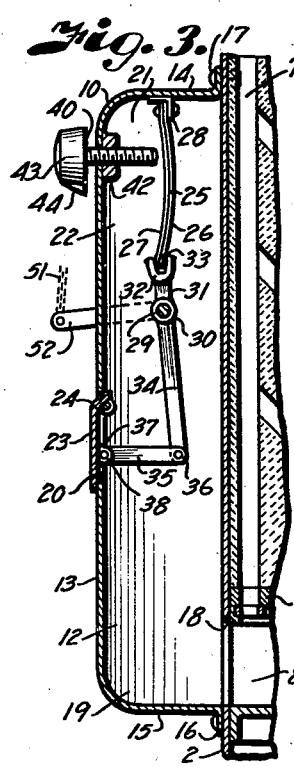
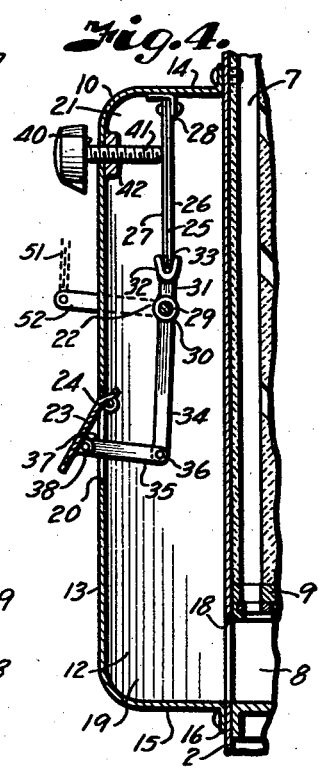
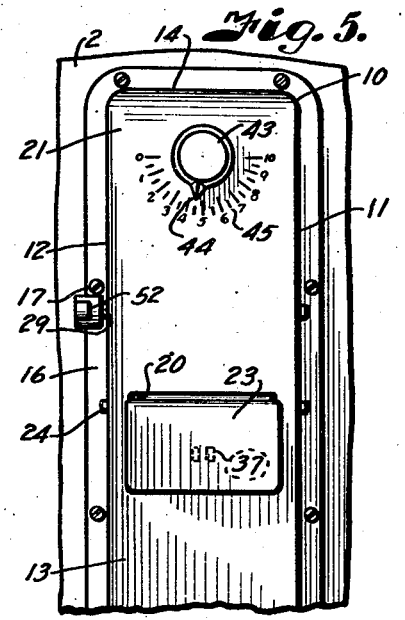
INVENTOR
*Thomas C. Cheasley.*
BY
*Paul E. Mullendore*
ATTORNEY Nov. 13, 1945. T. C. CHEASLEY 2,388,829
DRAFT CONTROL FOR HEATERS
Filed Sept. 19, 1941 2 Sheets-Sheet 2
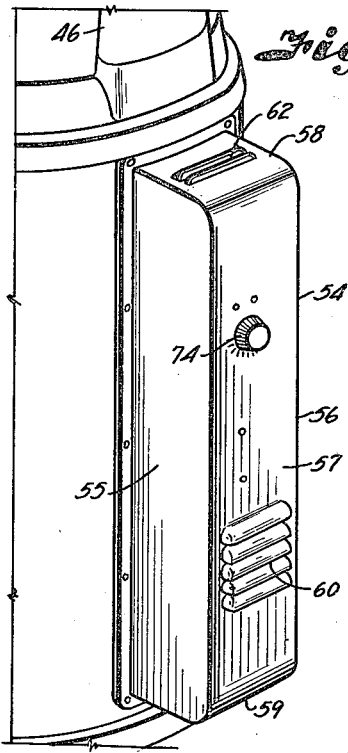
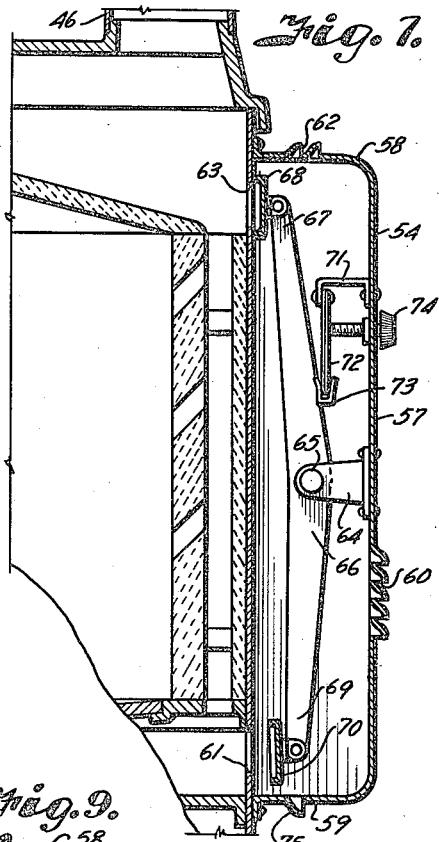
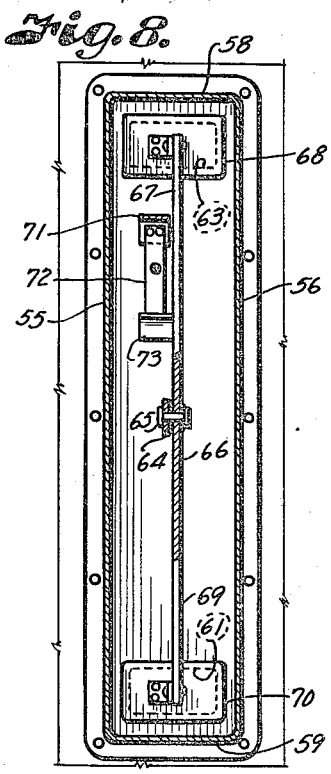
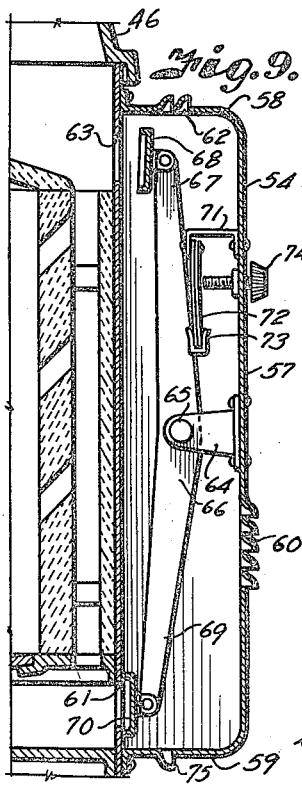
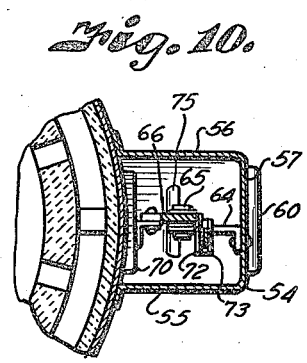
INVENTOR
Thomas C. Cheasley,
BY
Paul E. Mullendore
ATTORNEY Patented Nov. 13, 1945

2,388,829

UNITED STATES PATENT OFFICE 2,388,829

DRAFT CONTROL FOR HEATERS

Thomas C. Cheasley, Kansas City, Mo.

Application September 19, 1941, Serial No. 411,525

6 Claims. (Cl. 236—16)

This invention relates to heaters, and particularly an automatic draft control therefor, the principal object being to control the draft responsive to temperature of the heater jacket.

Other objects of the invention are to provide a thermostat element responsive to temperature which is so located that it is relatively unaffected by the draft air admitted into the heater; to provide a simple lever arrangement for effecting the required movement of the thermostatic elements; and to provide a simple and effective adjustment for the draft control to maintain a predetermined working temperature of the heater.

A further object of the invention is to provide a heater with a check-draft operable in conjunction with the draft control.

It is also an object of the invention to provide a draft control which operates in conjunction with means for admitting combustion supporting air at a point above the combustion chamber when the supply of combustion supporting air to the bottom of the heater is closed off.

In accomplishing these and other objects of the invention, as hereinafter pointed out, I have provided improved details of structure, the preferred form of which is illustrated in the accompanying drawings, wherein:

Fig. 1 is a perspective view of a heater equipped with draft control mechanism embodying the features of the present invention.

Fig. 2 is a section through the draft control on the line 2—2 of Fig. 1.

Fig. 3 is a section on the line 3—3 of Fig. 2 showing the damper in closed position.

Fig. 4 is a similar section showing the damper in open position.

Fig. 5 is a front elevational view of the draft control.

Fig. 6 is a perspective view of a portion of a heater equipped with a modified form of the invention.

Fig. 7 is a vertical view through a portion of the heater and the draft control mechanism therefor.

Fig. 8 is a section on the line 8—8 of Fig. 7.

Fig. 9 is a sectional view similar to Fig. 7 but showing the air inlet at the bottom of the heater closed and the air inlet at the top of the heater open.

Fig. 10 is a horizontal section on the line 10—10 of Fig. 9.

Referring more in detail to the drawings:

1 designates a heater of the type disclosed in my copending application on "Heater," filed June 21, 1941, Serial No. 399,112, and which includes an outer shell or jacket 2 supported on a base 3 and having a top 4. The top 4 has a door opening 5 through which fuel, such as coal or the like is emptied into the magazine 6, wherein the fuel is coked and the resultant gas consumed in an annular combustion chamber 7 which surrounds the magazine with the flame playing on the inner wall of the jacket, combustion being supported by air from the ash-pit 8 through the grate 9 and into the chamber 7 from where the products of combustion are discharged through a flue outlet. Since heaters of this character will operate over a long period of time with a single stoking of the magazine. it is desirable to provide an automatic control of the draft air to maintain a predetermined working temperature of the heater.

In carrying out the invention, I provide the jacket 2 with a substantially elongated duct-like case 10 arranged vertically of the heater and extending from adjacent the ash-pit into covering relation with a portion of the combustion chamber 7. The duct-like case includes side walls 11—12, a front 13, and upper and lower ends 14—15 which may be formed of sheet metal and provided with a flange 16 surrounding the side of the duct opposite the front wall 13, whereby the case is secured to the heater jacket by fastening devices, such as bolts 17, or the like.

Formed in the heater, in alignment with the ash-pit, is an opening 18 having connection with the lower end 19 of the case. Formed in the front wall of the case, in upwardly spaced relation with the opening 18, is an air inlet opening 20 through which combustion supporting air is supplied by way of the case through the opening 18 to the ash-pit. The upper end 21 of the case, or that portion above the opening 20, constitutes a housing for closing a thermostat operating mechanism 22 which automatically controls flow of combustion supporting air through the opening 20. The opening 20 is, therefore, provided with a door or damper 23, hinged to the side walls of the case as indicated at 24, whereby the lower portion of the door may swing outwardly and upwardly from closed position to admit air responsive to control of a thermostatic mechanism, as now to be described.

Fixed to the upper end of the case, and out of the path of air moving through the draft openings, is a thermostatic element 25. The thermostatic element 25 illustrated is of the bi-metal type and includes a flat strip of material 26 having a low degree of expansion and contraction, and a strip of metal 27 having a high degree of expansion and contraction, the metals being secured together whereby change in temperature thereof causes curving of the strips, from a normally straight condition at a base temperature, in the direction of the strip having the low coefficient of expansion when the temperature is raised and which curves in the opposite direction when the element is cooled. The upper end of the bi-metal thermostat is rigidly attached to a bracket 28 carried by the upper end wall 14 and the lower end depends within the case but terminates short of the opening 20, as shown in Fig. 4.

Journalled on a shaft 29, which has its ends carried by the side walls 11 and 12 at a point spaced below the lower end of the thermostatic element, is a lever 30. The lever 30 includes a relatively short arm portion 31 having a head 32 provided with a groove 33 to receive the free end of the thermostatic element. The lever also includes a longer arm 34 depending downwardly in the case but terminating adjacent the opening 20, as shown in Figs. 3 and 4. The free end of the arm 34 is connected with the door or damper by a link 35, one end of the link being pivotally connected with the lever by a pin 36 and the other end being connected with an ear 37 on the door by means of a pin 38.

When the heater is operating at low working temperatures or the jacket is cold, the parts are adjusted to retain the damper open, that is, the short arm will have moved in a clockwise direction, Fig. 4, from a straight up and down position, and the longer arm of the lever will have moved toward the door to hold it open until the working temperatures in the heater have increased sufficiently to cause curving of the thermostatic element in the opposite direction and movement of the arm in an anticlockwise direction to effect rapid closing of the door 23, thereby shutting down the draft to the heater and correspondingly reducing the draft which reduces the working temperature.

Movement of the thermostatic element to damper closing position may be adjusted to maintain any predetermined working temperature by means of an adjusting screw 40 having a shank 41 turned into an internally threaded nut 42 carried by the front wall of the case at a point near the upper end thereof, and which is adapted to bear against the bi-metal thermostat to control curvature thereof. The outer end of the adjusting screw carries a knob 43 having a pointer 44 movable over a scale 45. By turning the screw inwardly so that it effects shifting movement of the thermostatic element to the right, Fig. 4, the door is opened, and by slacking off the screw in the opposite direction the door is closed. Consequently the door may be set relatively to the opening 20 to effect maintenance of a predetermined temperature.

In the heater illustrated, the outlet pipe 46 is provided with a laterally opening check-draft 47 for the admission of air when the damper 23 is closed, whereby the draft through the flue is relieved through the check-draft 47 when the heater reaches a predetermined temperature as set by the thermostat regulating mechanism. The check-draft 47 is provided with a damper 48 which is fixed to a shaft 49, having a crank-arm 50 at one end connected by a chain or other suitable connector 51 with an arm 52 on the shaft 29. The damper 48 is normally retained in closed position by a weighted arm 53 fixed to the opposite end of the shaft 49 as best shown in Fig. 1. It is thus obvious that when the thermostat moves to close the damper 23, the arm 52 will swing downwardly to effect opening of the damper 48 and allow admission of air to the pipe 46. When the thermostat operates in the opposite direction to open the damper 23, the weight 53 becomes effective to close the damper 48.

In using the heater equipped with a draft control constructed as described, a fire is kindled in the bottom of the magazine and sufficient amount of fuel is inserted so as to maintain a bed of burning fuel in the bottom of the magazine. As the heat is generated and the jacket warms up, the heat is transmitted to the thermostat, and as the heat accumulates the damper will close to shut off draft through the heater and to open the damper 48 when the heater has reached the operating temperature as set by the control knob 39.

When the heater cools, the thermostat correspondingly cools to open the damper and allow increased draft through the heater for promoting combustion so that the heater will maintain the predetermined working temperature of the heater. It is thus obvious that when the draft control mechanism is set, the heater may be kept operating at a substantially uniform temperature.

By moving the thermostat closer to the jacket it heats quicker and the responsive movement of the damper is more rapid, and by backing off the screw so that the thermostat is further away from the jacket, the time required to actuate the damper is lengthened.

While I have shown the damper or door opening outwardly, it is obvious that it may be arranged to swing inwardly, in which case the position of the bi-metal thermostat will be reversed so that upon heating it moves in the required direction. It is also obvious that a grill or the like may be placed over the opening in the case and the damper placed over the opening in the ash-pit, without departing from the spirit of the invention.

The form of the invention shown in Figs. 6 to 10 inclusive includes a case 54 having side walls 55—56, a front 57, and a top and bottom 58 and 59 to form an elongated duct having an open side for attachment to the jacket of the heater, similar to the duct-like case previously described. The front wall 57 is provided with a plurality of louvered inlet openings 60 adjacent the lower portion thereof for admitting combustion supporting air to the opening 61 in the ash-pit of the heater, which opening is complementary to the opening 18 of the first described form of the invention. The top 58 of the case has a smaller number of louvered openings 62 which serve as vents and also for admitting air to an opening 63 formed in the jacket of the heater at a point above the fuel magazine so that air is admitted to the products of combustion discharged through the outlet pipe 46. Some of the air passing through the opening 63 will be admitted through the openings 60 which will be sufficient to carry away accumulated heat surrounding the thermostat, later described. Fixed to the inner face of the front wall 57, at a point above the louvered openings 60, is a bracket 64, and pivoted to the bracket, as at 65, is a lever 66 having an upper arm 67 carrying a damper 68 for closing the opening 63. The lever also has a depending arm 69 carrying a damper 70 to close the opening 61. Also fixed to the inner face of the front wall of the case, at a point above the bracket 64, is a bracket 71 to which is fixed a bi-metal thermostat 72. The opposite end of the thermostat depends toward the fulcrum 65 of the lever and is anchored in a socket 73 fixed to the upper arm of the lever, as clearly shown in Fig. 7. The thermostat is so arranged that when the jacket is relatively cool, the damper 70 is open and the damper 68 closed, as shown in Fig. 7, but if the temperature of the jacket increases, the thermostat swings in the opposite direction to close the damper 70 and open the damper 68. The temperature at which the dampers are actuated by the thermostat may be controlled by a knob 74, similar to the control knob 43, previously described. When the heater heats to the point where the thermostat effects closure of the damper 70, the supply of combustion supporting air is shut off to the passageway surrounding the fuel magazine, however, these gases will be combusted before they are discharged through the pipe 64 since the damper 68 has opened to admit flow of air through the louvered openings 60 and 62 to opening 63 into the flue passageway, whereby a sufficient amount of air is supplied to the gas for combustion thereof. The openings 62 also perform an important function of venting the case and prevent heat from accumulating around the thermostatic element when the damper 68 is closed. The bottom 59 of the case has a louvered opening 75 for discharging dirt and any ashes that may spill through the opening 61.

What I claim and desire to secure by Letters Patent is:

1. A draft control for a heater having a jacket forming a side of a combustion chamber and having air inlets for admission of air to said combustion chamber at the top and bottom thereof, a duct-like case covering said air inlets and having a portion in heat conducting relation with said jacket, said duct-like case having upper and lower air inlets, a lever pivoted in said duct-like case and having dampers for alternately controlling said air inlets of the jacket, and a thermostat located intermediate the air inlets of the duct-like case for actuating said lever.

2. A draft control for a heater having a jacket, a fuel magazine in the jacket spaced from a portion of said jacket to form a flue-like combustion chamber having air inlets at the upper and lower ends thereof, a duct-like casing fixed to the jacket in covering relation with the air inlets to said flue-like combustion chamber and having an air inlet intermediate the air inlets to said flue-like combustion chamber, a lever pivotally mounted in the duct-like casing and having arms terminating adjacent said inlet openings to the upper and lower ends of the flue-like combustion chamber, dampers connected with said lever arms and adapted to alternately engage said inlet openings to the flue-like combustion chamber, a thermostat having one end fixed within the duct-like casing and having its opposite end connected with said lever to rock the lever responsive to temperature within said duct-like casing, and means for adjustably tensioning said thermostat.

3. A draft control for a heater having a jacket, a fuel magazine in the jacket spaced from a portion of said jacket to form a flue-like combustion chamber having air inlets at the upper and lower ends thereof, a duct-like casing fixed to the jacket in covering relation with the air inlets to said flue-like combustion chamber and having an air inlet intermediate the air inlets to said flue-like combustion chamber, a lever pivotally mounted in the duct-like casing and having arms terminating adjacent said inlet openings to the upper and lower ends of the flue-like combustion chamber, dampers connected with said lever arms and adapted to alternately engage said inlet openings to the flue-like combustion chamber, a thermostat having one end fixed within the duct-like casing and having its opposite end connected with said lever to rock the lever responsive to temperature within said duct-like casing, and means for adjustably tensioning said thermostat, said duct-like casing having air inlet openings in the upper and lower ends thereof adjacent said upper and lower inlets to the flue-like combustion chamber.

4. A draft control for a heater having a jacket, a fuel magazine in the jacket and spaced therefrom to form a flue having connection with the magazine for flow of gases evolved in the magazine into the flue for burning therein and having an air inlet in the lower end of said flue for admission of air to said flue, said heater jacket having an opening in substantially direct connection with said air inlet to the lower end of the flue, a duct-like member covering said opening and having a portion in heat conducting relation with said jacket, said member having an air inlet spaced from the air inlet of the magazine in the direction of the opposite end of the duct to cause the air to move within the duct in contact with said portion in heat conductive relation with the jacket, means controlling passage of the air through said inlets, and thermostatic means located in said duct-like member for actuating said control means.

5. In a heater having a fuel magazine and a jacket surrounding the magazine forming a flue substantially coextensive with the height of the magazine and having connection with the magazine and in which gases evolved from fuel burning in the magazine are burned in said flue, said heater having air inlet openings substantially in direct connection with the upper and lower ends of said flue, an air duct secured to the jacket coextensive with the flue and having ends connected with the air inlets, dampers controlling said inlets, means connecting the dampers, said duct having openings for admitting air into the duct for discharge through said inlet openings to the flue, and thermostatic means in said duct for operating said damper connecting means to alternately open and close said dampers.

6. A draft control for a heater having a jacket, a fuel magazine in the jacket spaced from a portion of said jacket to form a flue-like combustion chamber having air inlets at the upper and lower ends thereof, a duct-like casing fixed to the jacket in covering relation with the air inlets to said flue-like combustion chamber and having an air inlet spaced from the air inlets to the flue-like combustion chamber whereby air is caused to move through the duct-like casing in heat exchange relation with the jacket, a lever pivotally mounted in the duct-like casing and having arms terminating adjacent said inlet openings to the flue-like combustion chamber, dampers connected with said lever arms, a thermostat in the duct-like casing, and means connecting the thermostat with the lever for effecting alternate opening and closing of the dampers.

THOMAS C. CHEASLEY.